April 21, 1970 R. A. BROWN ET AL 3,508,150
BLOCK INTERVAL DEMAND REGISTER WITH GENEVA RESET
Filed July 25, 1966
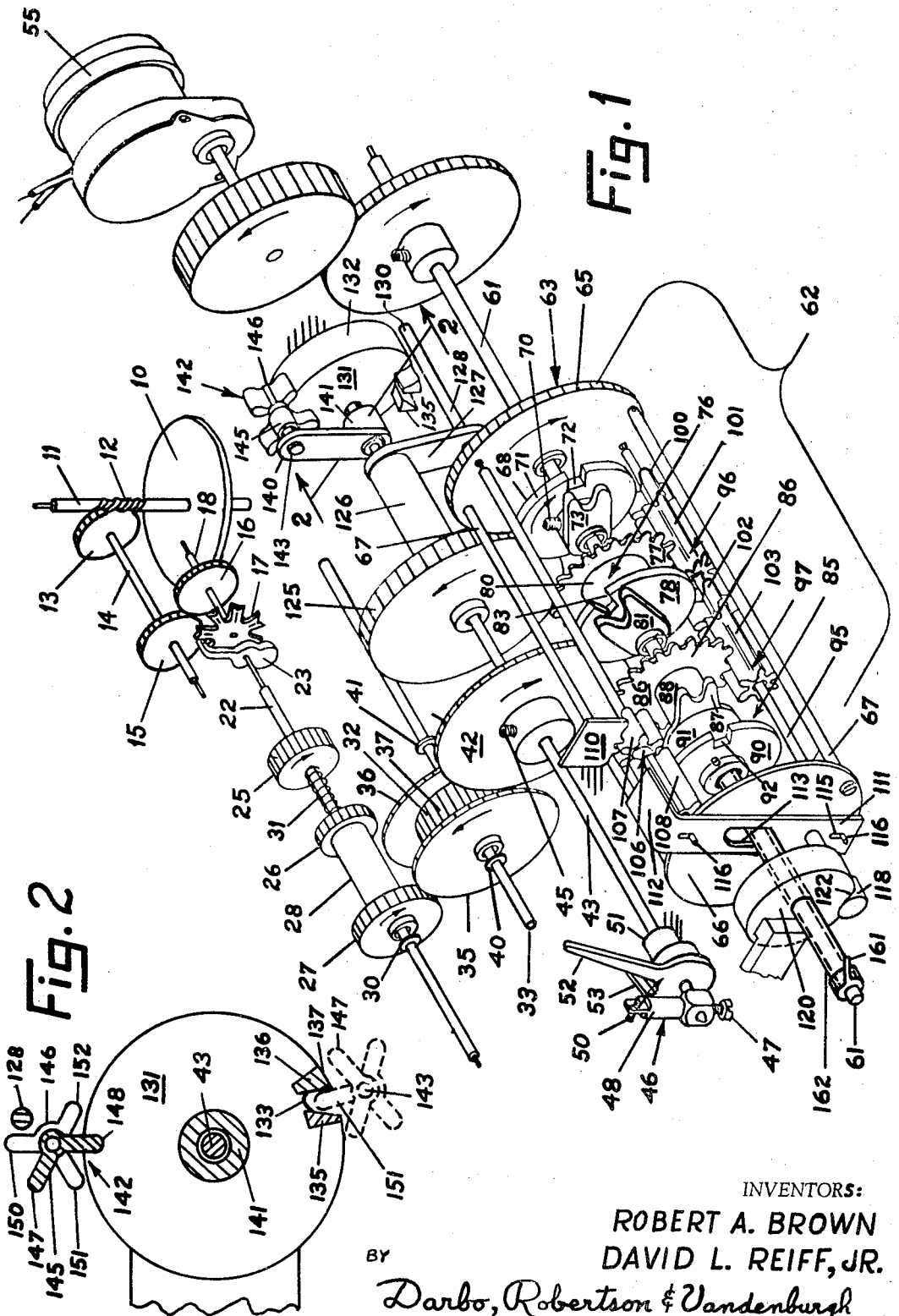
INVENTORS:
ROBERT A. BROWN
DAVID L. REIFF, JR.
BY
Darbo, Robertson & Vandenburgh
atty's United States Patent Office 3,508,150
Patented Apr. 21, 1970

3,508,150
BLOCK INTERVAL DEMAND REGISTER WITH GENEVA RESET
Robert A. Brown, Lafayette, and David L. Reiff, Jr., Battle Ground, Ind., assignors to Duncan Electric Company, Inc., Lafayette, Ind., a corporation of Indiana
Filed July 25, 1966, Ser. No. 567,679
Int. Cl. F16h 27/06; G01r 1/40
U.S. Cl. 324—103                    6 Claims

ABSTRACT OF THE DISCLOSURE

At the end of each measuring interval (block interval) a back-pusher orbits one revolution, sweeping back a pinionlike member in the same orbit. The pinionlike member is carried by an arm on the same shaft as the maximum demand pusher which is to be reset to zero. As the zero point is approached, a tooth of the pinionlike element which has been riding on the circumference of a disk ducks into a notch, permitting the pinionlike element to turn with respect to its carrying arm, thereby decelerating the pusher which stops at the zero point as the turning of the pinionlike element permits the back-pusher to escape.

---

This invention relates to electricity demand meters. More particularly, it relates to a mechanical demand register of the block interval type.

Suppliers of electrical energy compute their charges on the basis of the total amount of energy consumed over a relatively long period of time, such as a billing period of one month, and also upon the maximum rate of consumption, or the "demand" of the same consumer. The charge increases per kilowatt-hour to a consumer having a relatively inconsistent demand because of the necessity of the power companies to install equipment capable of handling the maximum demand. More capital equipment is required to serve a consumer if his peak is high, than if he used the same total energy but with a lower peak.

This invention concerns itself with providing a new and improved block interval maximum demand register, either as a separate unit or combined with a kilowatt-hour register. Such a unit measures the amount of power used by a consumer during each successive relatively short predetermined period of time or "block interval," and indicates the power consumed during that one time interval in the billing period during which the greatest amount of power was consumed. This value is then read at the end of each billing period to determine a rate for use in the computation of the consumer's bill.

During the first timed interval of a billing period, a maximum demand pointer, which forms a part of the demand register, is advanced in proportion to the quantity of electrical energy used. The mechanism includes a pusher element that advances the pointer by pushing against it, and leaves the pointer at its position of maximum advance when the pusher is returned to zero at the end of this first timed (and each) interval of time. All intervals have the same duration such as 15 or 30 minutes. For each succeeding interval, the pusher again advances from its zero position but does not advance the pointer unless the demand for this interval exceeds the demand already indicated thereby. Thus, the pointer will always indicate the maximum demand, i.e., the power consumed during that particular timed interval during which power consumption was the greatest. At the end of the billing period, the meter reader notes and records the maximum demand indicated by the pointer, and he then returns the pointer to zero to initiate the succeeding billing period.

Mechanisms previously proposed or used which accomplish the foregoing results have been found to have distinct disadvantages.

In one type of prior demand register, the zero position of the pusher is determined by a fixed stop which is struck by the pusher or a part directly connected to the pusher. This is objectionable in either of two respects. If the reset is motor driven, a fixed stop could cause jamming and stall the motor, unless a spring release of some sort is used; and a spring release has objections of its own. If the reset is not by motor drive but by a spring or other bias, the snap-action of such a return tends to cause a bounce away from the stop with the result that the pusher comes to rest slightly above zero instead of at zero. Furthermore, all resets due to mere bias have an inherent disadvantage in lack of reserve torque. If the reset is by positive motor drive, the motor can operate at very light loads, ordinarily, and yet have a high reserve of torque, if it should be needed to overcome some momentary high friction such as might result from a speck of dirt in the gear train. The lack of any reserve torque in a bias-return necessitates providing a relative strong bias against which the forward drive must operate, and which increases the bouncing tendency, and wear. In some registers, the zero or stopping point shifts with age because of wear, especially if wear on numerous parts can be cumulative.

According to the present invention, the zero position is determined without the use of a fixed stop, and without zero shift over a long life; and the return is of the positive, motor driven type. Dependable accuracy is achieved, even with a reasonably fast reset, by a device which causes a smooth deceleration to zero velocity at the termination of the reset, as the zero position is reached.

As compared to prior registers which are more comparable in performance to the present register, the present invention has advantages in the nature of economy and simplicity of manufacture. For example, the intermittent drive unit is one which can be preassembled, and inserted as a unit without danger of the parts losing their proper relationship. Furthermore, a Geneva-type multistage exponential intermittent drive device has been developed which, with a relatively small number of parts, can provide both the timing function and the transmission of a single revolution output of suitable speed at the end of the timing operation.

Additional objects and advantages of the invention will be apparent from a following description and from the drawings.

DESIGNATION OF THE DRAWINGS

FIGURE 1 is an exploded perspective view of one form of the invention chosen for illustration, the front to rear distance being elongated to permit an additional spacing of components for clarity of illustration; and FIGURE 2 is a cross-sectional view of portions of the reset mechanism taken substantially along the lines 2—2 of FIGURE 1.

DESCRIPTION OF FUNDAMENTALS

Pointer 52 is a maximum demand readout indicator which is readable in conjunction with a circular scale (not shown) along which its tip moves. This pointer has a maximum angular travel of less than one full revolution. At the end of each billing period, for example, once a month, the meter reader notes the reading of this pointer and then restores it back to a zero position on the scale to initiate the succeeding billing period.

After pointer 52 has been restored to zero, it will initially be advanced by pusher 46 which is driven forwardly (through mechanism including a gear train) by rotation of the meter disk or rotor 10. This same disk drives an additional register, not shown, to indicate the total energy use in terms of kilowatt-hours.

The initial forward dirve of the pointer 52 continues only through one "block interval." The duration of the block intervals, 15 minutes, 30 minutes or an hour, may be chosen by regulatory authority, and the timing devices correspondingly designed. The block intervals are equally timed by a synchronous motor 55. At the end of each block interval, something must be done to reset the pusher 46 back to its zero position, so as to begin measurement for a new block interval. The pusher leaves the maximum demand pointer 52 at the maximum position it attained during the interval. At the beginning of each successive demand interval, disk 10 again begins driving pusher element 46, but it must not advance the pointer 52 unless and until the pusher element catches up with the otherwise stationary pointer. Thereafter, until the interval is terminated by the timing motor 55, the disk continues to measure the demand in each interval, advancing the pointer 52 only when the power consumed during the interval exceeds the value already indicated by the pointer.

The present invention is concerned with providing a relatively simple and reliable mechanism for accomplishing the foregoing with dependable exactitude of the resetting operation.

GENERAL EXPLANATION OF INTERMITTENT DRIVE MECHANISM AND RESET

According to the present invention, the block interval reset is accomplished by a driving force derived from the timing motor 55. This is very desirable, inasmuch as such motors, althrough operating normally against very light loads, and free from a snap-action that can cause inaccuracies, can provide great increases of torque. This could become necessary to overcome an unusual increase in friction, such as might be due to the presence of a speck of dirt or the accumulation of foreign material such as dust. Reset is accomplished with the aid of an intermittent drive mechanism 62 in conjunction with reset mechanism driven by it. Intermittent drive mechanism 62, according to the preferred form of the present invention, is of an improved multi-turn form embodying the Geneva principle.

During the block interval, timing motor 55 drives a reset input shaft 61 which in turn drives internal portions of intermittent drive mechanism 62. These internal portions are designed to rotate during the timed interval without causing any effect external thereto, thus taking up play (or "idle motion") until all of the internal play is consumed. In the illustrated form, this lost motion is 100 turns. The length of time it takes to consume this lost motion is the length of time for one demand interval. Upon using up this internal play, the entire intermittent drive mechanism 62, including its outer cage portion 63, is inherently locked together as a unit to the reset input shaft 61 and rotates therewith for exactly one revolution, at the end of which time it again stops in its initial orientation to begin the succeeding interval. This rotational movement of the cage 63 accomplishes the reset of pusher element 46 through mechanism including a pair of arms 127 and 140, and stationary annular member 131. As soon as pusher 46 reaches its initial position, the watt-hour meter again begins advancing it proportional to the consumption of electrical energy while the intermittent drive mechanism times the interval.

DESCRIPTION OF WATTHOUR METER CONNECTION

Referring now to the drawings in more detail, the demand register (comprising most of FIGURE 1) is conventionally driven by a watt-hour meter rotor or disk 10 which is fixed to a shaft 11 on which is formed a worm gear 12. The angular velocity of shaft 11 is proportional to the consumer's use of power, and this angular movement is transmitted to the demand register input through a simple gear train consisting of a worm wheel 13 mounted on a shaft 14 on which is also mounted another gear 15. Gear 15 drives a gear 16 which in turn drives a coupling wheel 17 by way of a common shaft 18.

REGISTER INPUT GEAR TRAIN

The demand register includes a separate set of support plates forming a chassis (omitted for the purpose of clarity) in which are mounted a plurality of shafts. Included among these shafts is a power consumption input shaft 22 carrying a dog 23 at its rear end for connection into coupling wheel 17 as the register is attached to the main meter frame. Dog 23 drives shaft 22 having gear 25 fixedly secured thereto which provides a drive to the kilowatt-hour register that indicates the total number of kilowatt hours consumed over the billing period. When a two-speed gear ratio is provided, input shaft 22 carries a pair of gears 26 and 27 rigidly connected together by means of a common collar 28. Gears 26 and 27 are normally constrained to rotate with shaft 22 by virtue of a friction coupling therewith consisting of a friction element 30 against which the hub of gear 27 is pressed by a friction spring 31. Friction element 30 is shown out of contact with gear 27 for clarity, whereas in fact they would be touching.

Gear 27 drives a compound idler gear assembly 32 which is rotatably mounted on an idler gear shaft 33 fixed mounted at each end in the demand register chassis. Idler gear assembly 32 includes front and rear gears 35 and 36, respectively, separated by a smaller diameter and relatively elongate gear 37. Front and rear thrust washers 40 and 41 (shown spread out and also out of contact with assembly 32 for clarity of illustration) are provided on idler gear shaft 33 to permit the positioning of idler gear assembly 32 in either a front or rear position. As shown in FIGURE 1, idler gear assembly 32 is in its front position (where it woulld normally abut thrust washer 40) which permits an input drive from gear 27 to gear 35 with gears 26 and 36 out of mesh. When in its rearmost position, idler gear assembly 32 abuts thrust washer 41 and is driven by gear 26 which is in mesh at that time with gear 36. The particular drive used depends upon the anticipated consumption of the consumer which thereby permits the same demand register to be installed in the establishments of a variety of consumers which may have widely varying power demands. Of course, a differently calibrated kilowatt-hour scale is used with each of the two positions of the idler gear assembly.

Driven by elongate gear 37 is a gear 42 mounted on a pusher shaft 43 by means of a set screw 45. Gear 42 remains in mesh with elongate gear 37 of idler gear assembly 32 regardless of whether the idler gear assembly 32 is positioned in its forward or rearward position.

Fixedly attached to the front end of pusher shaft 43 is a pusher element 46. A set screw 47 is provided to lock the pusher 46 onto pusher shaft 43 at the desired angular orientation. Pusher element 46 comprises an arm 48 carried by and extending transversely outwardly from pusher shaft 43, and arm 48 carries an adjustment screw 50 therein at its outer end.

Supporting pusher shaft 43 near its front end is a collar 51 which is rigidly connected to the register chassis. Collar 51 pivotally carries thereon a pointer or indicator 52. Indicator 52 is provided with means, such as tab 53 to permit the adjustment screw 50 on pusher 46 to angularly advance the indicator over a scale (not shown). It will be noted that pusher 46 only engages and advances the pointer 52 when moving generally clockwise, as viewed in FIG. 1, and counterclockwise movement of pusher 46 does not change the already established position of the pointer.

The mechanism described up to this point has been concerned principally with advancing the pointer 52 in proportion to the power consumed, and this mechanism is continuously driven forward by the coupling wheel 17 as long as power is used by the consumer. At the end of some predetermined interval of time, it is necessary to reverse the movement of pusher 46 back to its initial or starting position in order to measure the power consumed over the succeeding interval. The mechanism which permits this return movement or "reset" will be described next.

INTERMITTENT DRIVE MECHANISM

We will see that the reset operation is accomplished by driving arm 127 one revolution. This requires one revolution of gear 65. Accordingly, it is desirable to drive gear 65 one revolution at the end of each block interval. This revolution should be at a fairly good speed so that the time lost to demand measurement between intervals will not be excessive. This needed quick revolution of gear 65 at the end of each demand interval is accomplished by means of the intermittent drive mechanism drive 62. A major part of this mechanism is cage 63, which includes a drive gear 65 at one end, wheel 66 at the other end, and spacing rods 67.

The constantly driven shaft 61 extends through the cage 63 of drive mechanism 62, but has secured to it only a first stage Geneva rotor, comprising disk 68 and two-toothed segment 73. That they are secured to the shaft is represented by set screw 70. Disk 68 has a circular edge 71 interrupted by a notch 72. During most of each revolution of this rotor the remaining parts of the intermittent drive mechanism 62 are held stationary by virtue of the fact that the disk 68 nests between two widely spaced teeth of a pinion 100, holding that pinion from rotating. That pinion and a second pinion 101 jointly form a pinion pair 96 which is freely rotatable as a unit on shaft 95. Pinion 101 has twice as many teeth as pinion 100 and meshes with gear 77 of second stage rotor 76, thereby holding this rotor stationary. Disk 78 is part of this rotor and nests between two widely spaced teeth of pinion 102 holding it stationary. Pinion 102 and pinion 103 make up a second stage pinion pair 97 like pair 96. Pinion 103 has twice as many teeth as pinion 102 and meshes with gear 86 of rotor 85, holding it stationary at this time.

During each revolution of disk 68, as its notch 72 moves into position to receive a tooth of pinion 100, the two-toothed segment 73 moves into mesh with pinion 101 and turns it through an angularity corresponding to the angularity occupied by two teeth. Gear 77 has 20 teeth and this therefore turns gear 77 one-tenth of a revolution. The entire rotor 76 moves with gear 77, including stepped hub 80, disk 78 and two-toothed segment 81 on successive seats of hub 80. During one step in each revolution of rotor 76, two-toothed segment 81 passes through an arc of engagement with the pinion 103 while notch 83 receives a tooth of pinion 102. Pinion 103 accordingly drives gear 86 one-tenth of a revolution during every tenth revolution of first stage rotor 68.

As two-toothed segment 73 makes its one-hundredth pass in mesh with pinion 101, final stage rotor 85 moves through its tenth step to complete its revolution. Its stepped hub 88, two-toothed segment 87, and larger hub portion 91, disk 90 with its notch 92 all move together, and as we will see cause a temporary locking up of the Geneva parts in the middle of this movement so that for one revolution the shaft 61 is connected to drive the entire cage assembly 63.

Except during this one revolution of drive, the cage 63 is held from rotation by pinion 107 which has been in engagement with a stationary two-toothed segment 110 and has been held against turning by its associated pinion 108 of a unitary pinion pair 106. Pinion 108 has only half as many teeth as pinion 107. Pinion 107 has been held from turning by virtue of the fact that disk 90 nests between two of its teeth. During the one-hundredth engagement of first stage segment 73 with its pinion 101 movement is transmitted to rotor 85 so that its notch 92 moves into position to receive one of the teeth of pinion 108, and the two-toothed segment 87 moves into engagement with pinion 107. As two-toothed segment 87 moves halfway through its pass in mesh with pinion 107, the following occurs:

(1) The rotation of pinion 107 on two-toothed segment 110 starts a rotary movement of the entire cage 63 and releases pinion 107 from engagement with two-toothed segment 110.

(2) The rotation of pinion 108 (with pinion 107) causes its tooth 108 which has been in engagement with end or tab 112 of lock bar 111 to move away from this engagement so that the lock bar is free to slide on pins 116 (which are carried by wheel 66). Slots 113 and 115 thus permit the lock bar 111 to move in a direction such that its end 112 follows the tooth which has moved away from it.

(3) This movement of lock bar 111 is enforced by cam follower pin or roller 118 which cams out of notch 122 in stationary ring 120 as the cage begins to turn. While pin 118 is in engagement with the dwell of ring 120 (its periphery outside of the notch 122), the lock bar 111 is held with its inturned end 112 in a position to block rotation of pinion 108 about its own axis. Since pinion 108 cannot turn on its axis, neither can pinion 107, and this locks two-toothed segment 87 which is only halfway through its meshing movement past pinion 107. This likewise locks gear 86 and pinion pairs 97 and 96. Since two-toothed segments 81 and 73 will at this stage be only half-way through their meshing movement with pinions 103 and 101, it follows that these two-toothed segments are also locked.

Inasmuch as two-toothed segment 73 is firmly secured on constantly rotating shaft 61, and is in mesh with pinion 101 which is not permitted to turn, two-toothed segment 73 carried pinion 101 along with it and therefore rotates the entire cage 63 as long as pinion 101 is held against rotation on its own axis. This rotation of the cage thus continues while pin 118 rides throughout the peripheral dwell of ring 120, thus providing the desired one revolution of gear 65 to drive the reset mechanism.

As the pin 118 completes the revolution so that it reaches the point at which it can settle into notch 122, pinion 107 will simultaneously come into mesh with stationary two-toothed segment 110. This will cause a partial rotation of pinion 107, until this pinion and pin 118 reach the positions shown in FIGURE 1. As this terminal position is approached, the turning of pinion 108 (with pinion 107) will cause one of its teeth to raise inturned tab 112 of lock bar 111, shifting lock bar 111 to the position shown in FIGURE 1. This same turning of pinion 107, as it again comes into mesh with stationary two-toothed segment 110, will release two-toothed segment 87 from mesh with pinion 107 thereby completing the $1/10$ revolution of rotor 85 which was interrupted by the locking action of lock bar 111. As this $1/10$ revolution of roto 85 is thus completed, pinions 97 and 96 will likewise rotate enough to free their respective two-toothed segments 81 and 73. Two-toothed segment 73 and its first stage rotor 68 will now begin a new revolution which will be the first revolution to begin the timing of the next block interval.

Gear 65, which may be considered rotatable output means of the intermittent drive mechanism 62, is in continuous mesh with a gear 125 journaled on pusher shaft 43. Gear 125 forms a portion of the reset mechanism that returns the pusher 46 to its initial or starting position. This portion of the reset mechanism is now described.

Gear 125 has rigidly attached thereto a rearwardly extending collar 126 that carries rigidly affixed thereto at its rear end a transversely outwardly extending arm 127, this assembly rotating freely on pusher shaft 43. Pressed into the outermost end of arm 127, and extending rearwardly therefrom, are pusher means in the form of an elongate pin 128 having a distal end 130.

Pusher shaft 43 extends rearwardly beyond arm 127 to a rearmost end which is rotatably mounted in the center of fixed orientation means in the form generally of a Geneva disk 131 having a generally circular periphery 132 modified slightly by a single notch 133 (FIG. 2) therein. Fixedly attached to disk 131 adjacent one side of notch 133, and extending forwardly therefrom, is a camming stop 135. Attached to disk 131 adjacent the other side of notch 133, and extending forwardly therefrom, is a second stop 136 having an outermost surface 137.

Rigidly affixed to pusher shaft 43 between arm 127 and disk 131 is an outwardly extending arm 140 connected to pusher shaft 43 by means of a hub 141 and carrying at its outer end pivotal means 142 which is in the nature of a pinion pair.

Pivotal means 142 is rotatably carried by pin 143 pivotally attached to arm 140 on which is mounted a front element 145 and a rear element 146, both elements being constrained to rotate as an integral unit. Front element 145 lies in a plane immediately in front of disk 131 and includes two outwardly extending teeth or fingers 147 and 148 in generally boomerang configuration. Rear element 146 lies in the same plane as disk 131 and includes three outwardly extending and equally angularly spaced teeth or fingers 150, 151, and 152.

As can be best seen in the solid lines of FIGURE 2, the spacing between pusher shaft 43 and pin 143 is designed to cause two of the fingers (herein shown as 151 and 152) to ride around the circular periphery 132 of disk 131, thereby preventing pivotal movement of pivotal means 142 relative to arm 140. However, limited pivotal movement is achieved as pivotal means 142, having been driven around the periphery of wheel 131 approach the position shown generally in broken lines in FIG. 2. A detailed description of this operation will follow shortly.

It should be noted here that each of the main shafts 22, 33, 43 and 61 are parallel with one another and are supported at or near each end by the demand register chassis.

DESCRIPTION OF OPERATION

In operation, and assuming for convenience that the demand register is beginning to measure the power consumption over the first interval of a billing period, pusher 46 will be in its initial or starting position. Adjustment screw 50 thereon will be in contact with tab 53 of pointer 52, and pointer 52 will be pointing to "zero" on the kilowatt or demand scale (not shown).

As power is used by the consumer, meter disk 10 rotates causing worm gear 12 to drive coupling wheel 17 by way of the gear trains consisting of worm wheel 13, gear 15, and gear 16. Coupling wheel 17 drives dog 23 which forms a part of the demand register, and dog 23 in turn drives pusher 46 by way of gears 27, 35, 37 and 42. Pusher 46 is in contact with tab 53 of pointer 52 and therefore advances pointer 52 over the demand or kilowatt readout scale in proportion to the amount of electrical energy consumed.

Regardless of whether or not power is being consumed, the timing and reset mechanisms continue to time the demand intervals and make the movement required to return the pusher 46 back to its initial position at the end of each interval.

The timing operation has already been described under the heading "Intermittent Drive Mechanism." It should be remembered that at the end of each interval, intermittent drive mechanism 62 causes one fairly rapid revolution of gear 65.

Gear 65 drives gear 125 on pusher shaft 43. This in turn drives arm 127 connected thereto and its rearwardly extending pin 128 in a sense opposite that of advancement for pusher 46. As a pin 128, which may be called a back-pusher, sweeps around fixed disk 131, its distal end 130 engages the outwardly extending finger 150 of pinion 146. Inasmuch as pivotal means 142 is constrained from pivoting about its axis, this constraint being provided by the circular periphery 132 of wheel 131, arm 140 is driven backward (counterclockwise as illustrated) around the periphery of wheel 131. Arm 140 and back-pusher 128 move concentrically about the axis of shaft 43. Since pusher 46 is directly connected to arm 140 by way of pusher shaft 43, pusher 46 is similarly driven rearwardly.

Although this rearward movement of pusher shaft 43 is transmitted to gear 27 on shaft 22 by way of indicator shaft gear 42 and idler gear assembly 32, it does not affect the rotation of watt-hour disk 10 because the friction element 30 permits slippage between shaft 22 and gear 27 during reset.

The position of pivotal means 142 corresponding with a zero position for pusher 46 is shown in broken lines in FIGURE 2. Just before arriving at the position shown there (while being pushed by pin 128) finger 148 of element 145 engages stop 135, tending to pivot pivotal means 142 to that position. Finger 151 is at the same time able to gain entry into notch 133. Pin 128, bearing on tooth or arm 150 then coacts with notch 133 to continue rotation of pivotal means 142, with gradually reducing speed of arm 140 and its pin 143 until distal end 130 of pin 128 is able to slide past the now pivoted and partially withdrawn finger 150. Pin 128 stops shortly thereafter when the single revolution of gears 125 and 65 (and cage 63) has been completed.

Because of the pivoting of pivotal means 142 before coming to rest, and because of the nature of the action of pin 128 on arm 147, arm 140 and pusher 46 connected thereto are gently decelerated to a zero angular velocity. Thus, pusher 46 has been positively, yet gently (without possibility of bounce or overrun) returned to its initial position in preparation for the measurement of a succeeding interval. Adjustment screw 50 is adjusted at the time of a test operation to make the pointer 52 accurately read "0" at this time; if resting against screw 50.

It is to be noted that the position of pointer 52 was not affected during the return movement of pusher 46. Thus, during each succeeding interval, pusher 46 will merely initially advance toward the point of contact between adjustment screw 50 and tab 53 on the pointer 52. Only if the power consumed during a succeeding interval exceeds the power consumption already recorded by pointer 52 on the readout scale will tab 53 be reengaged by the pusher so as to advance pointer 52. In this way, the block interval demand register keeps an indication only of the maximum demand, the power consumed during that interval in billing period during which the power consumption was the greatest. At the end of the billing period a meter reader notes this value and returns the pointer 52 to its zero position on the readout scale. As pointer 52 is thus manually returned, it pushes pusher 46 and arm 140, likewise to the zero position. The movement is limited by contact of arm 147 with surface 137 of stop 136. A pointer 161 visible to the reader may be provided on an elongated hub 162 of rotor 85 so that he may know if a block interval is near its end, or a reset is in progress. In either case he may defer his manual return.

ACHIEVEMENT

From the foregoing it is seen that an exceptionally dependable, and reasonably simple, timed reset device for block interval demand pushers has been provided. The reset is motor driven, and therefore has reserve torque and no bounce. It has withstood accelerated life testing without detectable zero shift. The timing unit permits a hundred idle turns and then transmits positive drive at a desired speed, and yet can be pre-assembled economically and is quite compact.

We claim:

1. In a block interval type of electrical demand register for indicating the maximum electrical demand of a consumer over a given billing period and including both a movable readout indicator which is driven by a pusher element, from an initial position, proportional to electrical consumption, and a continuously operating timing motor, reset mechanism connected between said motor and pusher element for periodically resetting said pusher element to its initial position, comprising: an intermittent drive unit including a reset input shaft constantly driven by said timing motor, rotatable output means, means intermittently connecting said reset input shaft and said rotatable output means both for providing a direct connection therebetween at the ends of successive intervals and idle motion therebetween during said intervals, the output means being stationary during the intervals and means maintaining said direct connection over a specific angular displacement of said input shaft; and reset means forming a driving connection between said output means and said pusher element for returning said pusher element to its initial position between said intervals.

2. In a block interval type of electrical demand register for indicating the maximum electrical demand of a consumer over a given billing period and including both a movable readout indicator which is driven by a pusher element, from an initial position, proportional to electrical consumption, and a continuously operating timing motor, mechanism connected between said motor and pusher element for periodically resetting said pusher element to its initial position, comprising: an intermittent drive unit driven by the timing motor, and reset means driven between intervals by the intermittent drive unit;

said reset means including a rotatable pusher shaft rigidly connected to said pusher element, said shaft carrying an arm extending transversely outwardly therefrom and carrying pivotal means thereon pivotable about its own axis moving with said arm, a reset actuator rotatable concentrically with said shaft for engaging said pivotal means during reset and for driving said pusher element rearwardly toward its initial position, and fixed orientation means for preventing pivoting of said pivotal means about its axis, relative to said arm, as said pusher element is driven toward its initial position until the terminal approach thereto, said fixed orientation means including terminal means for ending rotation of said pusher shaft when said pusher element reaches its initial position and for permitting pivotal movement of said pivotal means and releasing said actuator from said pivotal means to continue its movement beyond said terminal means.

3. Pusher reset mechanism for use in an electrical maximum demand register having a pivotally movable pusher element which advances an indicator over a readout scale, said reset mechanism including a timing motor and idle motion means driven thereby for providing a periodic one-revolution output, pusher-related means coupled angularly with said pusher element for advancement and return therewith, and back-pusher means driven by said output concentrically with said pusher-related means and in a direction opposite advancement thereof for periodically engaging said pusher-related means and returning it and said pusher element to their initial position, then moving beyond it in the same direction.

4. Reset mechanism according to claim 3, wherein said idle motion means comprises a multi-stage exponential form of Geneva mechanism.

5. Pusher reset mechanism for use in an electrical maximum demand register having a pivotally movable pusher element which advances an indicator over a readout scale, said reset mechanism including a timing motor and idle motion means driven thereby for providing a periodic one-revolution output, pusher-related means coupled angularly with said pusher element for advancement and return therewith, and back-pusher means driven by said output concentrically with said pusher-related means and in a direction opposite advancement thereof for periodically engaging said pusher-related means and returning it and said pusher element to their initial position;

said pusher-related means including pivotal means pivotally carried on an arm rigidly connected to said pusher element and having fingers extending outwardly therefrom and one of which is engaged by the back-pusher means; and said reset mechanism also including fixed orientation means for interacting with said fingers and preventing relative rotation between said pivotal means and said arm both while said pusher element is advancing and returning, said fixed orientation means including terminal means for permitting limited pivotal movement of said pivotal means at its terminal approach to an angular position corresponding to the initial position of said pusher element to gently decelerate to rest said arm and allow said back-pusher means to continue therebeyond.

6. Reset apparatus for a maximum demand pusher element including: a circular stationary Geneva element having a notch in its circular portion:

a pivotally mounted element movable with the pusher element, in planetary manner about the Geneva element, having a projection in said notch when the pusher element is at zero position and movable in a planetary path along the circular portion of the Geneva element as the pusher element advances and is reset, the circular portion engaging the projection during reset to restrain spin of said pivotally mounted element except as its projection enters said notch; a reset element movable concentrically with said Geneva element; means for driving the reset element exactly one revolution for each reset of the pusher with termination of movement each time at a point not reached by the maximum planetary movement of said pinionlike element; and an outwardly extending formation on said pivotally mounted element which is restrained to lie in the path of said reset element while spin is restrained by said circular portion but which recedes from said path as the zero position is reached, due to a turning of the pivotally mounted element about its axis with consequent reduction in speed of its planetary movement to zero.

References Cited

UNITED STATES PATENTS

| 1,536,097 | 5/1925 | Harris | 324—103 |
| 2,006,321 | 6/1935 | Stark et al. | 324—103 |
| 2,160,415 | 5/1939 | Emens | 324—103 |
| 2,382,009 | 8/1945 | Heynisch | 324—103 |
| 2,497,678 | 2/1950 | Macintyre et al. | 324—103 |

GERRARD R. STRECKER, Primary Examiner

U.S. Cl. X.R.

74—84